United States Patent
Matsumoto

(10) Patent No.: US 11,740,830 B2
(45) Date of Patent: Aug. 29, 2023

(54) INFORMATION PROCESSING APPARATUS

(71) Applicant: CANON KABUSHIKI KAISHA, Tokyo (JP)

(72) Inventor: Akihiro Matsumoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 17/096,812

(22) Filed: Nov. 12, 2020

(65) Prior Publication Data

US 2021/0149585 A1    May 20, 2021

(30) Foreign Application Priority Data

Nov. 19, 2019 (JP) .................................. 2019-208993

(51) Int. Cl.
  *G06F 3/06* (2006.01)
(52) U.S. Cl.
  CPC .......... *G06F 3/0655* (2013.01); *G06F 3/0611* (2013.01); *G06F 3/0676* (2013.01); *G06F 3/0679* (2013.01)
(58) Field of Classification Search
  CPC ...... G06F 3/0659; G06F 3/061; G06F 3/0689; G06F 3/0679; G06F 3/0611; G06F 3/0676; G06F 3/0655
  USPC ................................................ 711/154, 162
  See application file for complete search history.

(56) References Cited

U.S. PATENT DOCUMENTS

| 6,493,796 B1* | 12/2002 | Arnon | G06F 11/2064 |
| | | | 709/213 |
| 2007/0067584 A1* | 3/2007 | Muto | G06F 11/2071 |
| | | | 714/E11.102 |
| 2015/0095570 A1* | 4/2015 | Lee | G06F 11/2087 |
| | | | 711/114 |
| 2018/0024613 A1* | 1/2018 | Matsumoto | G06F 1/3287 |
| | | | 713/310 |
| 2018/0113772 A1* | 4/2018 | Akiba | G06F 3/0619 |

FOREIGN PATENT DOCUMENTS

JP    2018073005 A    5/2018

* cited by examiner

*Primary Examiner* — Hashem Farrokh
(74) *Attorney, Agent, or Firm* — Canon U.S.A., Inc. IP Division

(57) ABSTRACT

An information processing apparatus in which a controller continues transmission, based on a status in which a response to a writing instruction is received from a first storage device, and a response to the writing instruction is not received from a second storage device, of data to the first storage device, and stops transmission of data to the second storage device, and based on a status in which a second communication IF receives a completion notification of storing of the data that is issued by the first storage device, a first communication IF transmits a completion notification of processing corresponding to the writing instruction.

14 Claims, 12 Drawing Sheets

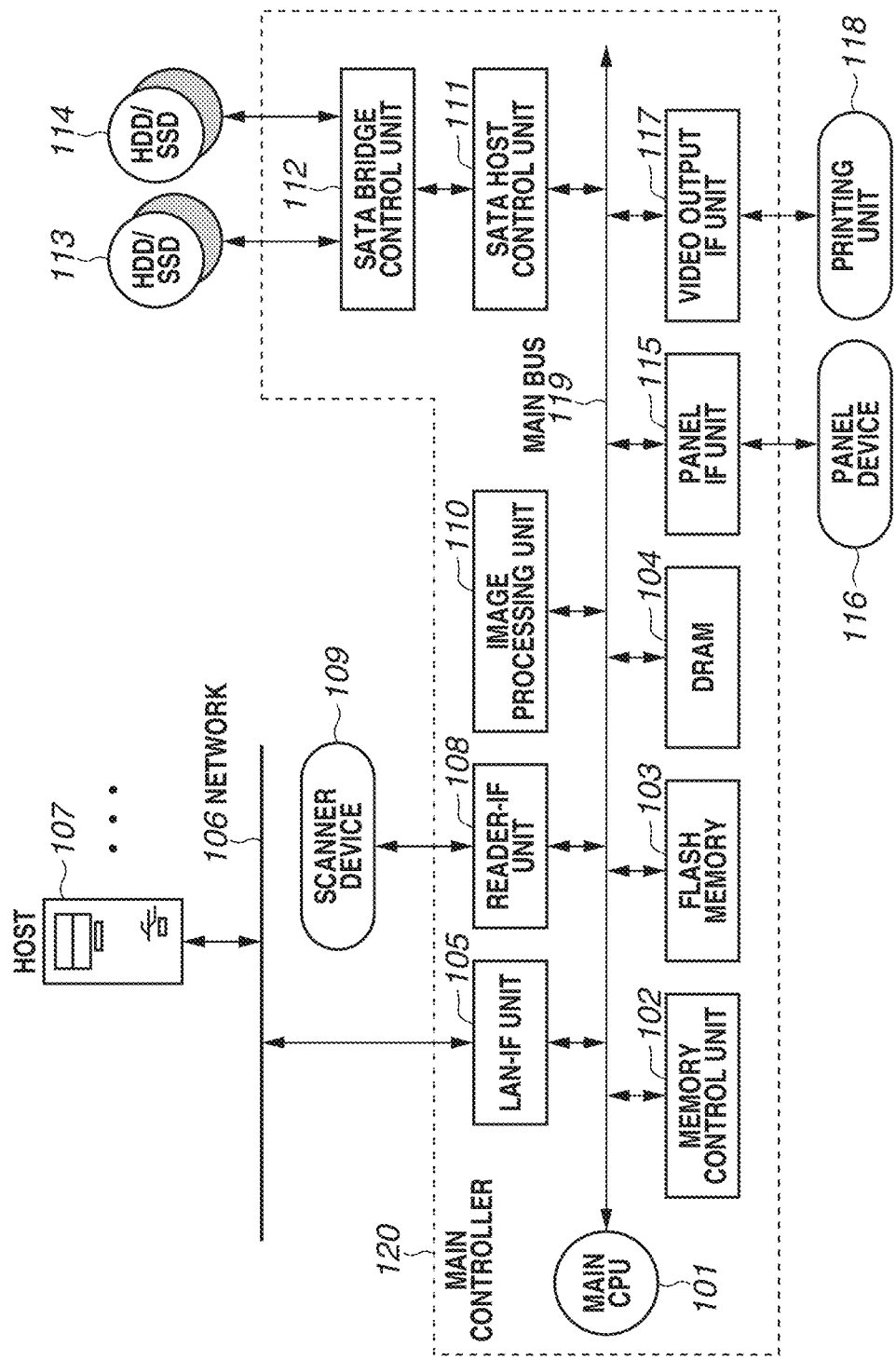

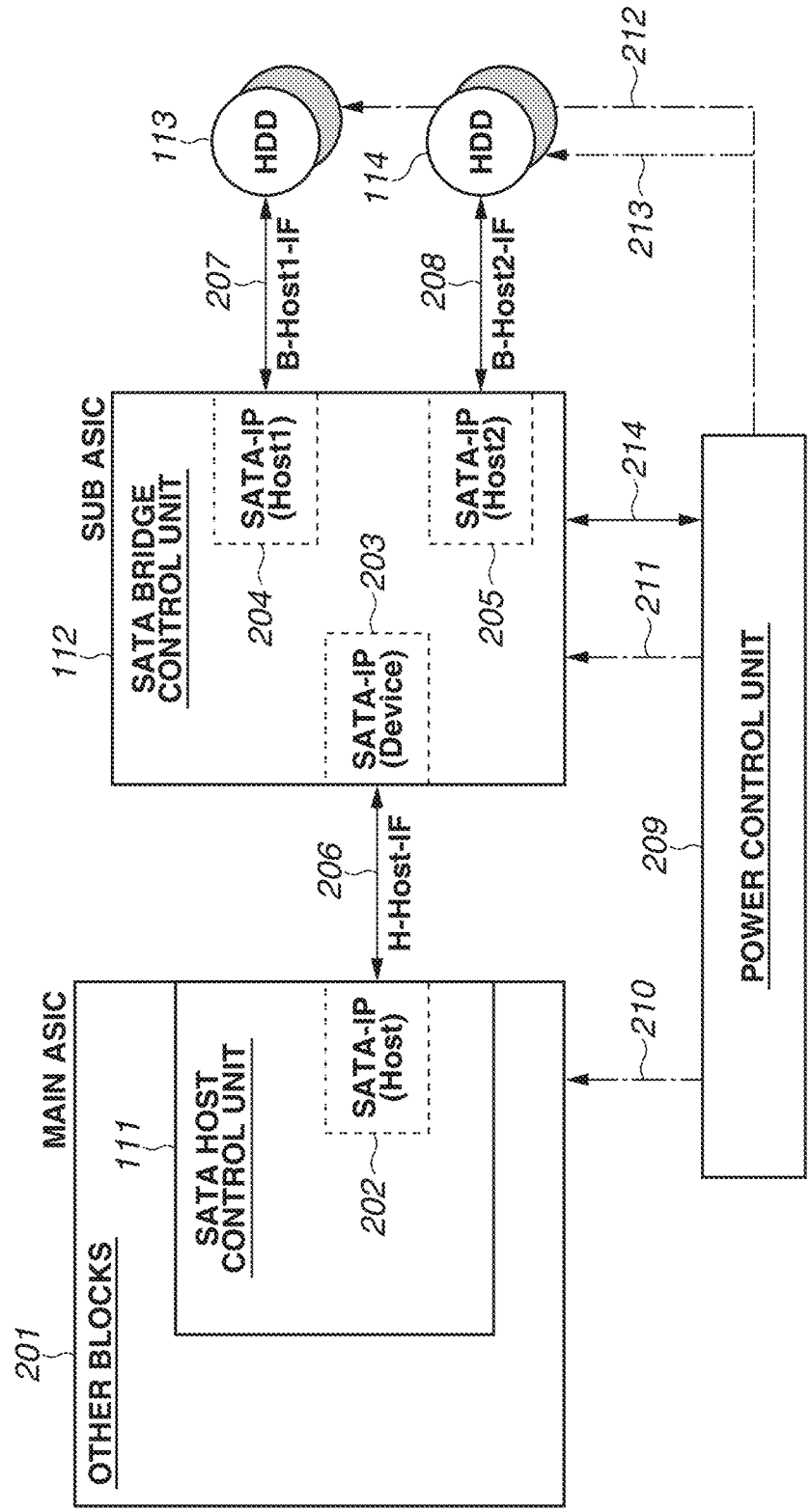

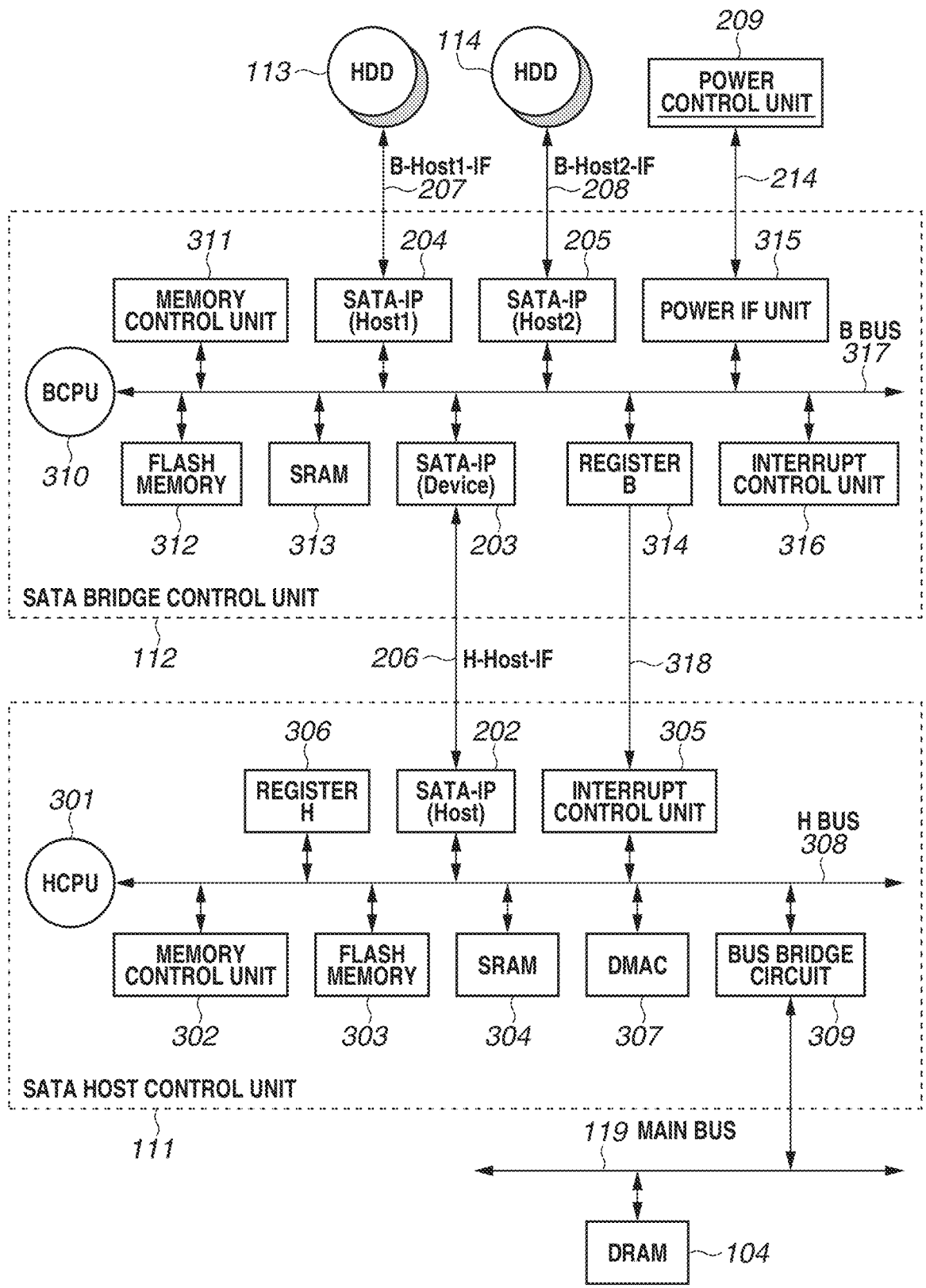

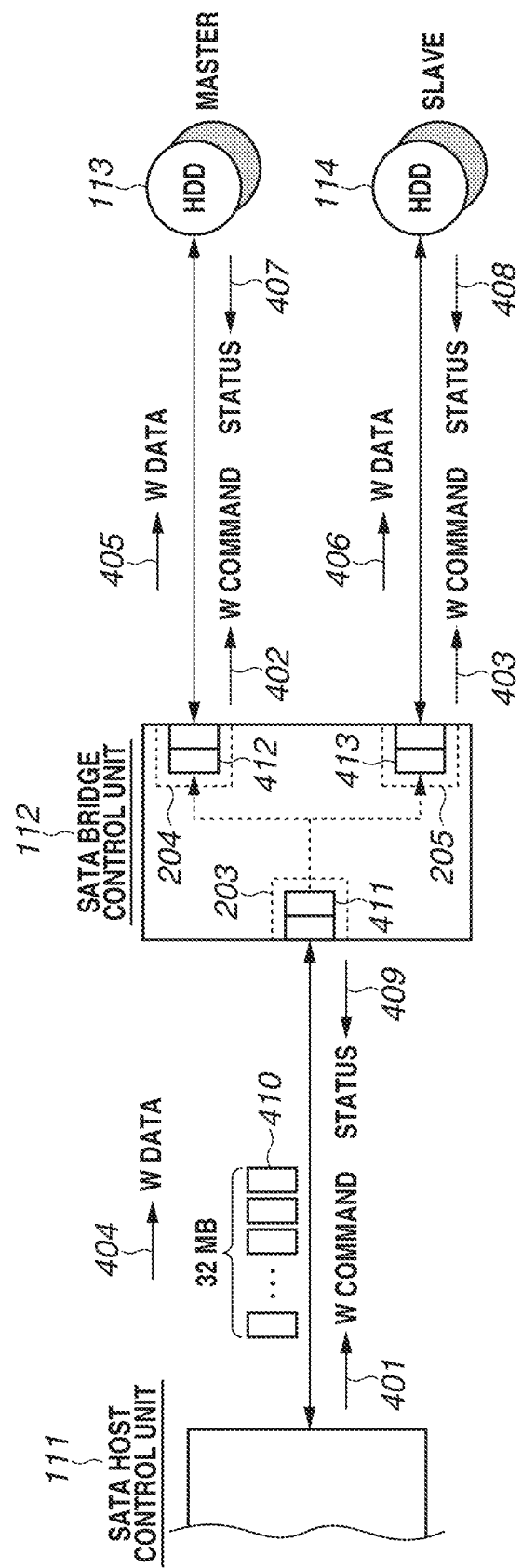

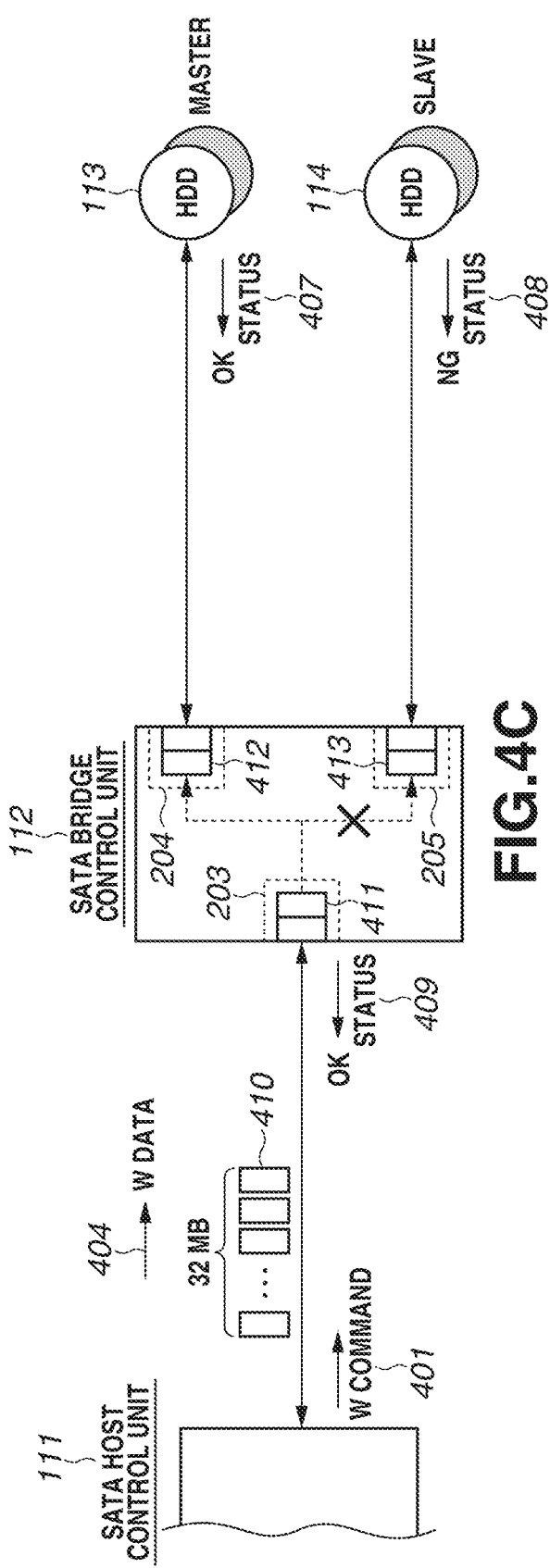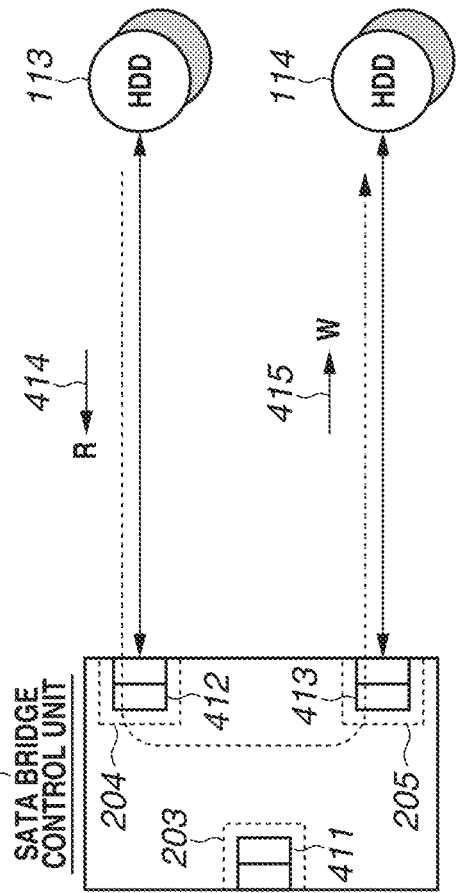

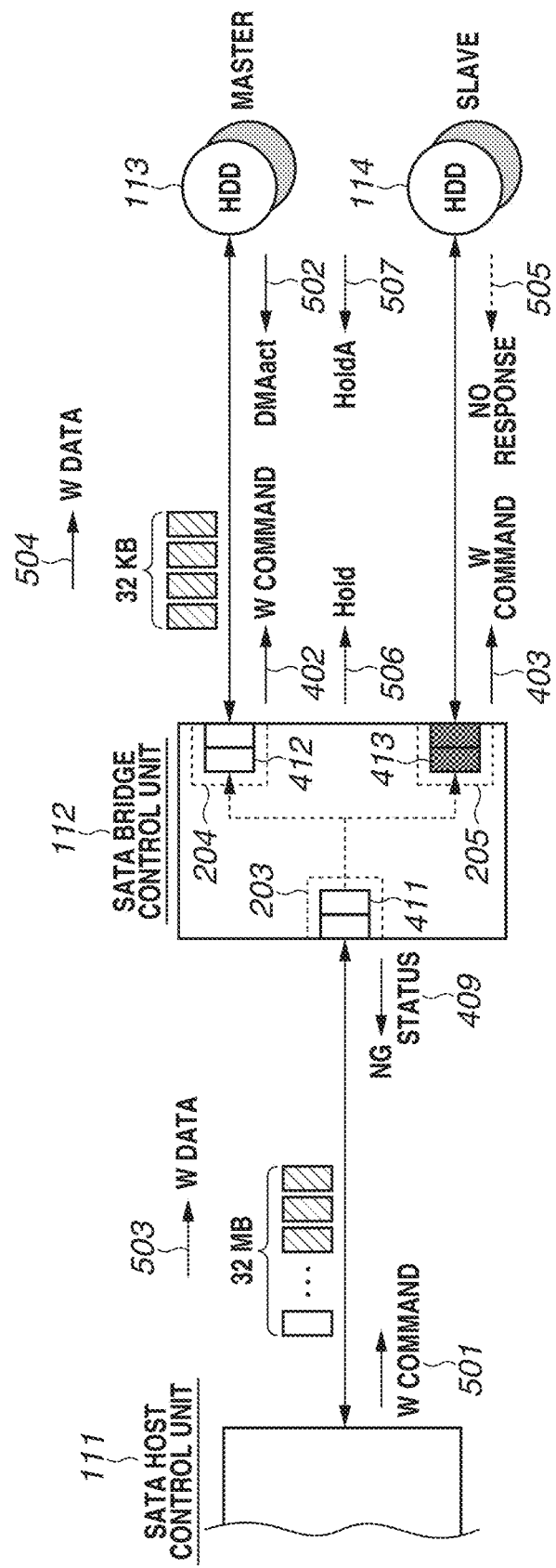

FIG.11

| EXTENDED COMMAND NAME | CMD NUMBER | TRANSFER TYPE | INSTRUCTION |
|---|---|---|---|
| SetupBridge | 01h | PO | VARIOUS SETTINGS OF SATA BRIDGE CONTROL UNIT (MODE SETTING, OTHER CONDITION SETTINGS OF TIME OUT, ETC.) |
| GetBridgeInfo | 02h | PI | ACQUISITION OF STATUS OF SATA BRIDGE CONTROL UNIT |
| ... | ... | | |

1001, 1002, 1003, 1004, 1005, 1006, 1007, 1008, 1009, 1010 though HDDs and SSDs are mixedly mounted as a mirroring configuration, writing/reading responses from SSDs are quick, but writing/reading responses from HDDs are slow.

INFORMATION PROCESSING APPARATUS

BACKGROUND OF THE INVENTION

Field of the Invention

The present disclosure relates to an information processing apparatus and a control method of an information processing apparatus.

Description of the Related Art

Some information processing apparatuses such as printing apparatuses are equipped with a plurality of storage devices (hereinafter, "storages") to implement a mirroring function. The mirroring function is a function of writing data with the same size from the same address into all storages such as a plurality of hard disc drives (HDDs) or solid state drives (SSDs). The control of the mirroring function is performed by a controller that performs mirroring control (hereinafter, "controller").

If the controller receives a writing/reading request from an upstream host controller, the controller issues an instruction suitable for the received request to the plurality of storages that is under mirroring control. Then, if the controller receives a response from each of the plurality of storages used in the mirroring function, the controller returns a response to the upstream host controller.

If, for example, the controller receives a response indicating that writing/reading has been normally completed, from all the storages (two storages), the controller returns a response indicating that writing/reading has been normally completed, to the host controller. In addition, if, for example, the controller receives a response indicating that writing/reading has been normally completed, from one storage of the two storages, and receives a response indicating that an error has occurred, from the other storage, the controller also returns a response indicating that writing/reading has been normally completed, to the host controller. Then, if, for example, the controller receives a response indicating that an error has occurred, from both of storages of the two storages, the controller returns a response indicating that an error has occurred, to the host controller.

The speed of writing/reading into/from a plurality of storages used in the mirroring function sometimes varies depending on the storages. For example, if a plurality of storages (HDDs) of the same type is used, writing/reading responses from a part of HDDs are quick, but writing/reading responses from other HDDs are slower than those from the part of HDDs (alternatively, no response is returned). The situation occurs due to aging degradation of HDDs and a difference in performance, for example. In addition, as discussed in Japanese Patent Application Laid-Open No. 2018-73005, when HDDs and SSDs are mixedly mounted as a mirroring configuration, writing/reading responses from SSDs are quick, but writing/reading responses from HDDs are slow.

SUMMARY OF THE INVENTION

According to an aspect of the present disclosure, an information processing apparatus including a nonvolatile first storage device and a nonvolatile second storage device, includes a first communication interface (IF) configured to receive a writing instruction of data, a second communication IF configured to transmit the writing instruction to the first storage device, a third communication IF configured to transmit the writing instruction to the second storage device, a controller configured to control transmission of data to the first storage device via the second communication IF, and transmission of data to the second storage device via the third communication IF, wherein, based on a status in which a response to the writing instruction is received from the first storage device, and a response to the writing instruction is not received from the second storage device, the controller continues transmission of the data to the first storage device, and stops transmission of the data to the second storage device, and wherein, based on a status in which the second communication IF receives a completion notification of storing the data issued by the first storage device, the first communication IF transmits a completion notification of processing corresponding to the writing instruction.

Further features of the present disclosure will become apparent from the following description of exemplary embodiments with reference to the attached drawings.

BRIEF DESCRIPTION OF THE DRAWINGS

FIG. 1 is a block diagram illustrating a system configuration example of a main controller.

FIG. 2 is a block diagram illustrating a connection example of a serial advanced technology attachment (SATA) bridge configuration.

FIG. 3 is a block diagram illustrating an internal configuration example of each SATA control unit.

FIGS. 4A, 4B, and 4C are diagrams illustrating a conventional recovery sequence.

FIG. 5 is a diagram illustrating a configuration in which an issue occurs by the emergence of a nonreactive storage.

FIG. 11 is a table illustrating examples of an extended command.

DESCRIPTION OF THE EMBODIMENTS

Figure 6:
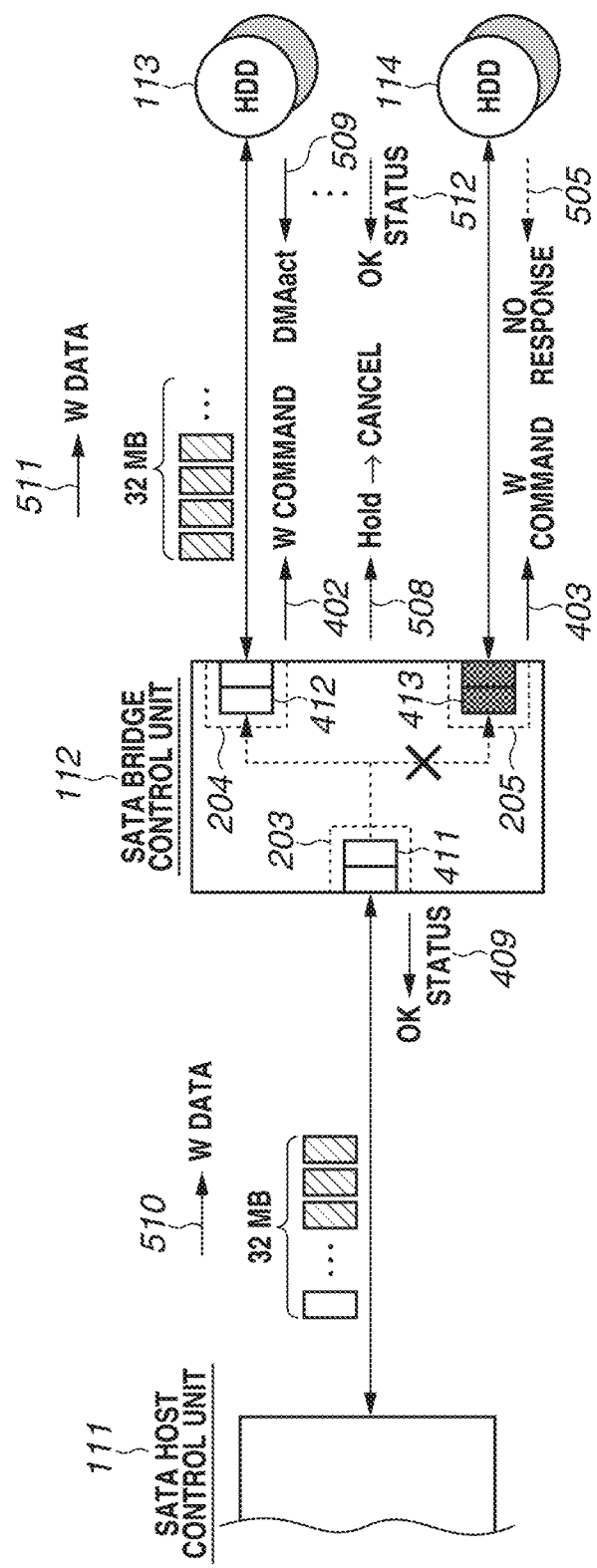
FIG. 6 is a configuration diagram illustrating stop processing to be performed when a nonreactive storage emerges, according to a first exemplary embodiment.

Exemplary embodiments of the present disclosure will be described in detail with reference to the attached drawings. The following exemplary embodiments are not intended to limit the invention set forth in the appended claims, and not all the combinations of features described in the exemplary embodiments are essential to the solution of the invention. For example, in each exemplary embodiment, the description will be given of two storage devices and serial advanced technology attachment interfaces (SATA-IFs) as an example of a mirroring configuration, but the mirroring configuration is not limited to this configuration. The number of storage devices is not limited as long as a plurality of storage devices is provided. In addition, the storage devices may be a plurality of HDDs, may be a plurality of SSDs, or may be a mixture of an HDD(s) and an SSD(s). In the following exemplary embodiments, an image processing apparatus is used as an example of an information processing apparatus.

FIG. 1 illustrates a system configuration example of a main controller 120 of an image processing apparatus according to a first exemplary embodiment. A main central processing unit (CPU) 101 performs a system control and various types of arithmetic processing. A memory control unit 102 performs an input-output control of various memory devices and a direct memory access (DMA) control.

A flash memory 103 is a rewritable nonvolatile memory, and stores control programs and control parameters of the entire system. A dynamic random access memory (DRAM) 104 is a rewritable volatile memory represented by a double data rate (DDR) memory. The DRAM 104 is used as a work area of programs, a storage area of printing data, and storage area of various types of table information. FIG. 1 schematically illustrates a relationship between the memory control unit 102 and various memory devices. Generally, the various memory devices are independently controlled by the memory control unit 102.

A local area network interface (LAN-IF) control unit 105 performs an input-output control with a local area network 106 connected to a printing apparatus. Generally, the LAN-IF control unit 105 is compliant with a Transmission Control Protocol/Internet Protocol (TCP/IP) protocol. The printing apparatus is connected with a network-compliant device such as an external HOST computer 107 via a network cable, and can perform printing via a network. A reader-IF control unit 108 controls communication with a scanner device 109.

A copy function is implemented by printing input image data scanned by the scanner device 109. An image processing unit 110 performs various types of image processing on image data captured via the LAN-IF control unit 105 or the reader-IF control unit 108.

A SATA host control unit 111 (SATA circuit) performs a data input-output control with a device having an IF that is compliant with a SATA standard. A SATA bridge control unit 112 (SATA circuit) is connected as a device to the SATA host control unit 111 on the upstream side, and includes a plurality of Host-IFs on the downstream side. The SATA bridge control unit 112 is connected with hard disk drives (HDDs)/solid state drives (SSDs) 113 and 114 via the Host-IFs. The SATA bridge control unit 112 is equipped with value-added functions such as a redundant arrays of inexpensive disk (RAID) control and a data encryption.

In the present exemplary embodiment, the description will be given assuming that the SATA host control unit 111 and the SATA bridge control unit 112 are each mounted on the main controller 120 as an independent application specific integrated circuit (ASIC).

A panel IF unit 115 performs communication control with a panel device 116. By operating liquid crystal screen display or buttons on a panel as a user interface (UT), which is not illustrated in FIG. 1, various settings of the printing apparatus and state confirmation of the printing apparatus can be performed.

A video output IF unit 117 performs communication control of a command/status with a printing unit 118 and transfers printing data to the printing unit 118. The printing unit 118 includes a printing apparatus main body, a sheet feeding system, and a sheet discharging system, which are not illustrated in FIG. 1. The printing unit 118 prints printing data onto a sheet in accordance with command information mainly from the video output IF unit 117. A main bus 119 includes a bus controller. For the sake of convenience, the main bus 119 collectively represents a control bus, a data bus, and a local bus between arbitrary blocks. Representative examples of the main bus 119 include a Peripheral Component Interconnect Express (PCIe) and an internal bus of an ASIC.

FIG. 2 is a diagram illustrating a connection example as a SATA bridge configuration. A main ASIC 201 is a central ASIC that controls the entire system of the main controller 120 including the SATA host control unit 111. The SATA host control unit 111 includes one SATA-intellectual property (IP) 202 as a host IF. A sub ASIC is equivalent to the SATA bridge control unit 112, and is mounted on the main controller 120 as an independent integrated circuit (IC).

The SATA bridge control unit 112 includes three SATA-IPs 203 to 205. On the upstream side of the bridge configuration, the SATA-IP (Host) 202 is connected with a SATA-IP (Device) 203 via an H-Host-IF 206. On the downstream side, the SATA-IP (Host1) 204 is connected with the HDD 113 (may be SSD) via a B-Host1-IF 207, and the SATA-IP (Host2) 205 is connected with the HDD 114 (may be SSD) via a B-Host2-IF 208.

The SATA-IPs 202 to 205 include SATA link layers and physical layers. In addition, in accordance with the setting of various SATA registers, the SATA-IPs 202 to 205 issue a physical SATA-standard command (serving as an electrical signal) to SATA devices connected via the SATA-IFs 206 to 208, and receive statuses from the SATA devices. In other words, the SATA-IPs 202 to 205 function as a communication unit.

In addition, the SATA bridge control unit 112 is connected with a power control unit 209 based on a control signal 214. The power control unit 209 is mounted on a main board, and determines whether to supply power to functional modules included in the main controller 120, and various devices connected to the functional modules. The power control unit 209 performs the power control of the entire printing apparatus system.

Dashed-dotted lines 210 to 213 starting from the power control unit 209 indicate power lines to the components of a SATA bridge unit, which is a part of the entire system. Thus, by communicating with the power control unit 209 via the control signal 214, the SATA bridge control unit 112 can turn OFF/ON/OFF/ON the power of the HDDs 113 and 114 at an intended timing.

FIG. 3 is a diagram illustrating internal configuration examples of the SATA host control unit 111 and the SATA bridge control unit 112. An HCPU 301 performs overall control as a SATA controller such as SATA command issuance processing, transfer processing of transmitted/received data, and status reception processing. In addition, the HCPU 301 communicates with the CPU 101 included in the main controller 120, via the main bus 119.

A memory control unit 302 performs an input-output control with a flash memory 303 and a static SRAM (SRAM) 304. The flash memory 303 stores boot programs and control programs as a SATA controller. The SRAM 304 is used as a work area of the HCPU 301, a storage area of various control tables and parameters, and a data buffer. FIG. 3 schematically illustrates a control of a single port RAM, a dual port RAM, and a First-IN First-OUT (FIFO) memory, as the SRAM 304. Actually, independently-controlled SRAMs may exist at a plurality of locations.

An interrupt control unit 305 performs input-output processing of an interrupt signal with respect to the HCPU 301, and mask processing on an interrupt signal. An interrupt signal 318 from the SATA bridge control unit 112 is also connected to the interrupt control unit 305. A register H 306 is a register for temporarily storing control parameters and status information. When initial addresses of a transfer source and a transfer destination and sizes, which are not illustrated in FIG. 3, are set in a predetermined register by the HCPU 301, and activation is performed, a direct memory access controller (DMAC) 307 performs data transfer between predetermined memories.

An H bus 308 includes a bus controller. For the sake of convenience, the H bus 308 collectively represents a control bus, a data bus, and a local bus between arbitrary blocks. A bus bridge circuit 309 is a bus bridge that interconverts bus protocols between the main bus 119 and the H bus 308. The DMAC 307 thereby becomes capable of accessing the DRAM 104 included in the main controller 120 and connected to the main bus 119.

A BCPU 310 performs, as a SATA controller, an overall control such as SATA command issuance processing, transfer processing of transmitted/received data, and status reception processing. A memory control unit 311 performs an input-output control with a flash memory 312 and an SRAM 313. The flash memory 312 stores control programs as a SATA controller such as boot programs and a mirroring processing program. The SRAM 313 is used as a work area of the BCPU 310, a storage area of various control tables and parameters, and a data buffer.

FIG. 3 schematically illustrates a control of a single port RAM, a dual port RAM, and an FIFO memory, as the SRAM 313. Actually, independently-controlled SRAMs may exist at a plurality of locations. A register B 314 collectively represents various registers used for temporarily storing control parameters and status information, and for issuing the interrupt signal 318.

A power IF unit 315 is connected with the power control unit 209 with the control signal 214, and controls a power OFF/ON request signal to the HDDs 113 and 114. An interrupt control unit 316 performs input-output processing of an interrupt signal from each of the SATA-IPs 204 and 205 with respect to the BCPU 310, and mask processing on an interrupt signal. A B bus 317 includes a bus controller. For the sake of convenience, the B bus 317 collectively represents a control bus, a data bus, and a local bus between arbitrary blocks. In addition, as described with reference to FIG. 2, the SATA-IP (Host) 202 of the SATA host control unit 111 and the SATA-IP (Device) 203 of the SATA bridge control unit 112 are connected via the H-Host-IF 206. Furthermore, the SATA-IPs (Host1/2) 204 and 205 are respectively connected to the HDDs 113 and 114 via the B-Host1/2-IFs 207 and 208.

FIG. 11 is a table illustrating examples of an extended command used for the setting of the SATA bridge control unit 112 and acquisition of information. An extended command is a unique command that can be used by the SATA bridge control unit 112, and is created using a vendor unique command (e.g., F0h) defined by a user and prepared based on the SATA standard.

For example, various extended commands are uniquely defined using an extended command name 1001, a CMD (sub command) number 1002, a transfer type 1003, and an instruction 1004 as illustrated in the table from the left on the first row in FIG. 11. In this table, a CMD number indicates a sub command number set in a feature register that corresponds to a vendor unique command (e.g., F0h). In addition, the SATA standard defines, as basic transfer types, transfer types such as Non-Data (ND) transfer not involving data, PIO-In (PI) or PIO-Out (PO) transfer for executing single data transfer, and DMA transfer for executing consecutive data transfer.

The transfer type 1003 in FIG. 11 defines a transfer type corresponding to the CMD number 1002. For example, a SetupBridge command 1005 is defined to have 01h (1006) as a CMD number and PO (1007) as a transfer type. In a similar manner, a GetBridgeInfo command 1008 is defined to have 02h (1009) as a CMD number and PI (1010) as a transfer type. The SetupBridge command 1005 is a command for performing various settings of the SATA bridge control unit 112. Parameters to be described below such as a timeout value are assumed to be preset using this command before a mirroring operation is started. The GetBridgeInfo command 1008 is an extended command for acquiring a status (internal information) of the entire SATA bridge control unit 112. States of connection with the HDDs 113 and 114 and an error type can be acquired using this command.

FIGS. 4A, 4B, and 4C are diagrams illustrating a conventional write (W) commands & statuses, and a recovery sequence in an abnormal state.

FIG. 4A is a diagram illustrating an image processing apparatus in a mirror state. The SATA host control unit 111 transmits a write (W) command 401 to the SATA bridge control unit 112 in response to a writing request from an upper level device. Then, upon receiving the W command 401, the SATA bridge control unit 112 executes command interpretation. Then, the SATA bridge control unit 112 transmits W commands 402 and 403 including the same content as the W command 401, to the respective HDDs 113 and 114, and starts counting time.

Upon receiving the W commands 402 and 403, the HDDs 113 and 114 return a response (DMAact packet to be described below) to the SATA bridge control unit 112. Then, based on a flow control of the SATA standard, the SATA host control unit 111 divides one piece of write (W) data 404 in a certain data packet unit 410 and transmits it to the SATA bridge control unit 112, which will not be described in detail.

The data unit in the SATA standard will now be described. The maximum size of data transferred in response to one command transmitted and received based on the SATA standard is 32 MB as indicated by the W data 404, and the data packet unit 410 of data transmitted and received via a transfer path in single transfer is 8 KB.

The SATA bridge control unit 112 includes buffers in the respective SATA-IPs 203, 204, and 205. In the present exemplary embodiment, as an example of each buffer size, 16 KB corresponding to data packet unit 8 KB×2 is set as a retainable storage capacity.

Generally, by increasing a size of data to be transferred in processing performed in response to one command, processing efficiency is enhanced. In this example, a size of each of the buffers 411, 412, and 413 is set to 16 KB, but this size is a value to be determined depending on the desired performance, and the size is not limited to this value.

Referring back to FIG. 4A, W data (partial data of the W data 404) transmitted from the SATA host control unit 111 to the SATA bridge control unit 112 is stored into the buffer 411. The SATA bridge control unit 112 causes the W data stored in the buffer 411, to be stored into the buffers 412 and 413. Then, the SATA bridge control unit 112 sequentially transmits the data stored in the buffers 412 and 413, to the HDDs 113 and 114 as W data 405 and W data 406. On the other hand, the buffer 411 deletes previous W data, and receives and stores the next W data. Hereinafter, the description of the deletion of previous W data will be omitted. The same applies to the buffers 412 and 413.

If writing of W data into at least one HDD ends, the SATA bridge control unit 112 causes a buffer corresponding to the HDD into which writing from the buffer 411 has been completed, to store next W data (part of the W data 404). For example, if the writing into the HDD 113 ends earlier and the writing into the HDD 114 ends later, after the next W data is stored into the buffer 412, the next W data is stored into the buffer 413. If the writing into the HDD 113 and the writing into the HDD 114 simultaneously end, the next W data is simultaneously stored into the buffers 412 and 413. As described above, the buffers delete previous W data and store next W data.

Then, the above-described transmission is repeated until all of the W data 404 transmitted from the SATA host control unit 111 to the SATA bridge control unit 112 are stored into the HDDs 113 and 114 via the SATA bridge control unit 112.

If the transfer of all the W data 404 to both the HDDs 113 and 114 has been normally completed within a preset timeout time, the SATA bridge control unit 112 receives OK (normal) statuses 407 and 408 respectively from the HDDs 113 and 114.

In such a case, the SATA bridge control unit 112 transmits a status (OK status) 409 to the SATA host control unit 111 as a writing processing normal end. Upon receiving the OK status 409 from the SATA bridge control unit 112, the SATA host control unit 111 ends a series of processes of the W command 401.

In this manner, a state in which data stored states of both the HDDs 113 and 114 are at the same level and consistent is defined as a mirroring state of a normal state of mirroring.

In the present exemplary embodiment, the description will be given assuming that the HDD 113 is a master storage and the HDD 114 is a slave storage. When a read (R) command is issued, readout processing from the master is executed, which is not illustrated in FIG. 4A.

FIG. 4B illustrates an example of a situation in which the SATA bridge control unit 112 receives, from one HDD, a status (NG status) indicating that writing has failed.

Specifically, FIG. 4B illustrates a case where the slave HDD 114 has failed in writing processing due to a certain cause.

At this time, the SATA bridge control unit 112 receives an NG (failure) status 408, and the BCPU 310 executes stop processing on the slave HDD 114. If the stop processing is executed, the SATA bridge control unit 112 stops transmitting partial data of the W data 404 received from the SATA host control unit 111, to the buffer 413, and transmits the partial data only to the buffer 412.

In other words, the BCPU 310 continues writing processing on the master side to which the normal HDD 113 is connected, initializes the SATA-IP 205 on the slave side to which the HDD 114 that has failed in writing is connected, and stops executing the current writing processing. By the initialization processing of the SATA-IP 205, the SATA bridge control unit 112 recognizes that a storage connected to the SATA bridge control unit 112 is the HDD 113 only. If a failed HDD can be merely ignored without executing the initialization processing, the initialization processing needs not be executed.

If the writing processing on the master side has been completed within the timeout time, the SATA bridge control unit 112 receives the OK status 407 from the master HDD 113. The SATA bridge control unit 112 thereby determines that the writing processing has been normally completed, and transmits the OK status 409 to the upper level SATA host control unit 111. Upon receiving the OK status 409, the SATA host control unit 111 ends the writing processing, and becomes capable of transmitting a next command.

On the other hand, the BCPU 310 of the SATA bridge control unit 112 starts, in the background, recovery processing of the failed HDD based on information regarding a start address and a data size in previous writing processing that is recorded onto the SRAM 313 during unprocessing.

The recovery processing to be performed after the situation illustrated in FIG. 4B will be described with reference to FIG. 4C. The SATA bridge control unit 112 performs initialization processing of the HDD 114 that has failed in writing processing, and starts data readout processing (R) 414 of a recorded start address and data size from the HDD 113 that has succeeded in previous writing processing.

Writing processing (W) 415 of sequentially writing the read data from the same address into the HDD 114 that has failed in writing processing is executed.

If a writing error occurs during the recovery processing, the BCPU 310 repeats the recovery processing a preset number of times, which is not illustrated in FIG. 4C. If the recovery processing has succeeded by repeating the recovery processing the preset number of times, the image forming apparatus transitions to a mirror state.

If the recovery processing has failed even if the recovery processing is repeated the preset number of times, the HDD 114 becomes unusable as a system, an HDD replacement notification is issued, and the operation of the apparatus is continued using only the one HDD 113 (in a degraded state).

At this time, the SATA host control unit 111 is notified of the HDD replacement notification via the interrupt signal 318. The SATA host control unit 111 has the GetBridgeInfo command 1008 for acquiring an internal state of the SATA bridge control unit 112, and can determine which HDD is to be replaced, using the command. The detailed description will be omitted.

Information recorded on the SRAM 313 is deleted after being used by the BCPU 310. In addition, a mirroring state (e.g., mirror state and degraded state) is recorded on the SRAM 313 or the register B 314 in the SATA bridge control unit 112.

FIG. 5 illustrates, as a configuration in which a problem occurs, a configuration in which an HDD nonreactive to a W command 501 emerges will be described.

In FIG. 5, the SATA host control unit 111 transmits a W command 501 and partial data (data transmitted in the data packet unit 410) of W data 503 to the SATA bridge control unit 112. The SATA bridge control unit 112 stores the partial data into the buffer 411, and stores the stored partial data into the buffers 412 and 413.

Then, the SATA bridge control unit 112 transmits the W commands 402 and 403 respectively to the HDDs 113 and 114, sets a timer (threshold value of elapsed time) with the transmission of the W commands 402 and 403 to the HDDs 113 and 114 as a starting point, and starts counting time.

In FIG. 5, in response to the W command 402, the HDD 113 returns a DMAact packet 502 indicating data transfer start interrupt to the SATA bridge control unit 112. Upon receiving the DMAact packet 502, the SATA bridge control unit 112 transmits the partial data stored in the buffer 411, to the HDD 113. If the received partial data is written into the HDD 113, the HDD 113 outputs the DMAact packet 502 to the SATA bridge control unit 112 for receiving next partial data from the buffer 411.

The DMAact packet 502 is a command transmitted by the HDD 113 for causing the SATA bridge control unit 112 to transmit divided data stored in the buffer 412.

On the other hand, in FIG. 5, the HDD 114 does not respond to the W command 403 within the time of the set timer. For example, if an HDD gets close to the end of its operating life or if the operating life expires, such no response occurs. In such a state, the HDD 114 does not return the DMAact packet 502 to the SATA bridge control unit 112.

Thus, at the second time, the buffer 412 of the SATA bridge control unit 112 enters a full state, and this causes such a situation that divided data of the first time is stored in the buffer 413 on the nonreactive side at the time point at which the writing of divided data of the second time into the HDD 113 ends. If such a situation occurs, because the divided data of the second time is not stored in the buffer 413, divided data of the third time cannot be stored into the buffer 412. In other words, if the data of the second time is not stored in the HDD 114, while divided data of the first and second times can be stored into the HDD 113, divided data of the third time and subsequent times cannot be stored into the HDD 113.

If such a situation occurs, the SATA-IP 204 controlling the buffer 412 issues a Hold packet 506 to the HDD 113. Upon receiving the Hold packet 506, the HDD 113 returns a HoldA 507 and enters a standby state.

On the other hand, because the HDD 114 remains in a nonreactive state, timeout occurs (elapsed time exceeds the set threshold value of elapsed time) without the SATA bridge control unit 112 receiving an OK status from both of the HDDs within the time of the timer.

Because timeout has occurred and writing processing has not been completed even though the SATA bridge control unit 112 has issued the W commands 402 and 403 to the both HDDs 113 and 114, the SATA bridge control unit 112 transmits the status (NG (failure) status) 409 to the SATA host control unit 111.

Upon receiving the NG status 409, the SATA host control unit 111 instructs the SATA bridge control unit 112 to execute rewriting processing (reissue the same W command 501).

As described above, a phenomenon in which an HDD becomes nonreactive occurs as a storage device deteriorates with time. Then, the nonreactive HDD might temporarily recover by turning off the power and then turning on again, but the HDD immediately becomes nonreactive again.

In other words, there is a high possibility that the rewriting processing instructed by the SATA host control unit 11 also fails. As a result, even if there is a usable HDD, the SATA host control unit 111 recognizes that all HDDs are unusable, and a failure as a system may occur. Furthermore, even if the SATA host control unit 111 acquires an NG status from the SATA bridge control unit 112, the SATA host control unit 111 cannot identify which HDD is in a nonreactive state.

FIG. 6 is a configuration diagram illustrating stop processing performed when a nonreactive storage emerges, according to the present exemplary embodiment. In the present exemplary embodiment, when one HDD enters a nonreactive state, data transmission to the one HDD is stopped, and data transmission to the other HDD is continued. Then, if the other HDD succeeds in writing processing, an upper level circuit (SATA host control unit 111) is notified that the writing processing has succeeded. The details thereof will be described below. The description of a part similar to the part illustrated in FIG. 5 will be omitted.

Also in the case of FIG. 6, the SATA bridge control unit 112 receives a W command from the SATA host control unit 111, receives divided data of the first time, stores the divided data into the buffer 411, and then, stores the divided data into the buffers 412 and 413. The SATA bridge control unit 112 transmits the W commands 402 and 403 respectively to the HDDs 113 and 114, sets a first timer (first threshold value of elapsed time) with the transmission of the W commands 402 and 403 as a starting point, and starts counting the first timer.

The SATA bridge control unit 112 receives a response (e.g., DMAact packet 502 (data transfer start interrupt)) to the W command from at least one of the HDDs 113 and 114. Upon receiving the response, the BCPU 310 stores, into the SRAM 313 or the register B 314, a notification indicating that data transfer to the HDD 113 has started. Then, the SATA bridge control unit 112 sets a second timer (second threshold value of elapsed time) with the reception of the response (data transfer start interrupt) as a starting point, and starts counting time of the second timer. The second threshold value is a value shorter than the first threshold value.

If the second timer times out (if the elapsed time exceeds the second threshold value) in a state where a response (data transfer start interrupt) is not received, the SATA bridge control unit 112 performs stop processing of the HDD 114. Because the stop processing and subsequent recovery processing are similar to those in FIGS. 4B and 4C, the description thereof will be omitted.

If the SATA bridge control unit 112 receives a response (data transfer start interrupt) from the HDD 114 within the time of the second timer, the SATA bridge control unit 112 continues the writing processing of the HDD 114.

A state where the SATA bridge control unit 112 can issue a command to each device means a state where each HDD is in a ready state (not busy). Once the SATA bridge control unit 112 issues a command, there is no other choice but to wait for a response from an HDD.

By setting the second timer, it is possible to prevent a normal device from failing in command processing due to the influence of an abnormal device when a failure such as nonreactive after the transmission of a W command occurs.

An interrupt signal for notifying the start of data transfer if data transfer to either HDD is started is output from the interrupt control unit 316. Upon receiving the interrupt signal from the interrupt control unit 316, the BCPU 310 stores a SATA-IP from which the interrupt signal is received, and sets the second timer.

The description has been given of an example in which a data transfer start is detected based on an interrupt signal from a SATA-IP, but the detection method is not limited to this method. As another example, a data transfer start may be detected based on a change in a counter value of the number of data transfer times.

Next, an example of a writing processing flow for implementing the configuration according to the present exemplary embodiment illustrated in FIG. 6 will be described with reference to FIG. 7. The flowchart according to the present exemplary embodiment is executed by the BCPU 310, and started when access to an HDD occurs.

In step S601, the BCPU 310 that is controlling the SATA bridge control unit 112 receives a W command from the SATA host control unit 111.

In step S602, the BCPU 310 interprets the content of the received command, and transmits W commands indicating the same content to the connected HDDs 113 and 114. Then, if the process in step S602 ends, the processing proceeds to step S603. In step S603, the BCPU 310 sets the first timer (first threshold value of elapsed time) in a timer circuit, and starts counting a time limit of the entire command processing. Because the setting and the count start of the first timer are only required to be triggered by the transmission of the W commands to the HDDs 113 and 114, the processes in steps S602 and S603 may be simultaneously performed or may be performed in a reverse order. The timer circuit is included in the SATA bridge control unit 112.

In step S604, the BCPU 310 waits for a response (data transfer start interrupt) from one of the HDDs (NO in step S604). If a response from one HDD is received (YES in step S604), the BCPU 310 starts data transfer to the HDD that has returned the response. If data transfer to one HDD is started, the processing proceeds to step S605. In step S605, the BCPU 310 sets the second timer (second threshold value of elapsed time) in a timer circuit, and starts counting a time limit for a device to which data transfer has not been started. The setting and the count start of the second timer are triggered by the reception of a response from the HDD 113 or 114.

The number of timer circuits in which the first and second timers are set is only required to be one or more. When the number of timer circuits is one, timer setting may be performed in the following manner. Specifically, the remaining time of the first timer is recorded, the second timer is set, and after the elapsed time exceeds the second timer, the remaining time of the first timer is set again. How to use the timer circuit is not specifically limited.

Next, in step S606, the BCPU 310 determines whether data transfer to the other HDD has been started.

In step S606, if the BCPU 310 receives a response (data transfer start interrupt) from the other HDD (YES in step S606), the BCPU 310 starts data transfer to the HDD that has returned the response. If data transfer to the other HDD is started, the processing proceeds to step S608.

In step S608, the BCPU 310 cancels the second timer. In step S609, the BCPU 310 executes the normal processing described with reference to FIGS. 4A, 4B, and 4C, on the both HDDs, and the processing proceeds to step S612. The cancelling of the second timer is cancelling the setting of the second timer and stopping counting the elapsed time of the second timer, for example.

Referring back to step S606, in step S606, if the BCPU 310 does not receive a response from the other HDD (NO in step S606), because data transfer has not been started, the processing proceeds to step S607. In step S607, the BCPU 310 determines whether the second timer has timed out. In other words, the BCPU 310 determines whether the elapsed time has exceeded the second threshold value.

If it is determined in step S607 that the second timer has not timed out (NO in step S607), the processing returns to step S606.

If it is determined in step S607 that the second timer exceeds a timeout time (YES in step S607), the processing proceeds to step S610. In step S610, the BCPU 310 executes stop processing on the HDD 114 that is nonreactive to the W command (that cannot start data transfer). More specifically, the BCPU 310 executes stop processing of stopping data transfer to the buffer 413 on the HDD 114 side. If the process in step 610 ends, the processing proceeds to step S611. In step S611, the BCPU 310 continuously performs data transfer to the HDD 113 to which data transfer has been started in step S604, and the processing proceeds to step S612.

In step S612, the BCPU 310 determines whether a writing processing status of both the HDDs 113 and 114 is a predetermined status. The predetermined status includes two statuses. If the processing proceeds to step S612 from step S611, the predetermined status is a status indicating that a writing processing status of the HDD 113 has been normally completed or a status indicating an error.

If the processing proceeds to step S612 from step S609, the predetermined status is a status indicating that writing processing of at least one HDD has been normally completed, or a status indicating that writing processing of all HDDs has become error. Being in the status indicating that writing processing of at least one HDD has been normally completed corresponds to a case where the HDD 113 is, for example, in a normal status and the HDD 114 is in an error state or writing processing of the HDD 114 is ongoing.

If it is determined in step S612 that the writing processing status is not the predetermined status (NO in step S612), the processing proceeds to step S613. In step S613, the BCPU 310 determines whether the first timer has timed out. If it is determined in step S613 that the first timer has not timed out (NO in step S613), the processing returns to step S609 or S611. On the other hand, if it is determined in step S613 that the first timer has timed out (if the elapsed time has exceeded the first threshold value) (YES in step S613), the processing proceeds to step S616. Specifically, if the processing proceeds to step S613 via step S611, this case corresponds to a case where the writing processing of the HDD 113 has not ended within the time of the first timer. If the processing proceeds to step S613 via step S609, this case corresponds to a case where one of the HDDs 113 and 114 is in an error state and writing processing of the other HDD has not ended within the first timeout time, or a case where writing processing of both HDDs has not ended within the first timeout time.

In these cases, the BCPU 310 determines in step S616 that writing processing is in an error state. Then, the SATA bridge control unit 112 transmits a status (failure notification) indicating that an error has occurred, to the SATA host control unit 111. If the process in step S616 ends, the flow ends.

Referring back to step S612, if it is determined that the writing processing status is the predetermined status (YES in step S612), the processing proceeds to step S614. In step S614, the BCPU 310 cancels the first timer. The cancelling of the first timer is cancelling the setting of the first timer and stopping counting the elapsed time of the first timer, for example. If the process in step S614 ends, the processing proceeds to step S615.

Next, in step S615, the BCPU 310 determines whether a result of writing processing of at least one of the HDDs 113 and 114 indicates a success. If it is determined in step S615 that the writing processing of both of HDDs has failed (NO in step S615), the processing proceeds to step S616. Because the process in step S616 has already been described, the description thereof will be omitted.

If it is determined in step S615 that the result of writing processing of at least one of the HDDs 113 and 114 indicates a success (YES in step S615), the processing proceeds to step S617. In step S617, the BCPU 310 transmits, to the SATA host control unit 111 that is a request source, a status (completion notification) indicating that writing processing based on a W command has been normally completed. This operation ends the processing between the SATA bridge control unit 112 and the SATA host control unit 111. The process in step S614 may be performed after the process in step S617.

In step S618, the BCPU 310 determines whether to execute recovery processing. If the BCPU 310 determines in step S618 not to execute recovery processing, i.e., if writing processing of both HDDs has succeeded (NO in step S618), the flowchart ends, and the BCPU 310 returns to a state in which a next command can be received.

If the BCPU 310 determines in step S618 that a state requiring recovery processing is caused (YES in step S618), the processing proceeds to step S619. The state requiring recovery processing is, for example, a case where there is an HDD on which stop processing has been performed, or a case where there is an HDD in an error status.

In step S619, the BCPU 310 starts recovery processing of an NG HDD. Because the recovery processing has already been described with reference to FIG. 4C, the description will be omitted. The recovery processing is repeated a preset number of retry times as necessary.

In step S620, the BCPU 310 determines whether recovery processing repeated (n−1) times has succeeded. If it is determined in step S620 that the recovery processing has succeeded in recovery processing repeated the (n−1) times (YES in step S620), the BCPU 310 then returns to a next command reception state.

If it is determined in step S620 that the recovery processing has failed even if recovery processing has been repeated the (n−1) times (YES in step S621), the processing proceeds to step S622. In step S622, the BCPU 310 determines whether to execute power OFF/ON as recovery processing. A power OFF/ON condition is preset.

If the BCPU 310 determines in step S622 to execute power OFF/ON as recovery processing (YES in step S622), the processing proceeds to step S623. In step S623, the BCPU 310 controls, via the power IF unit 315, the power control unit 209 to turn OFF and then ON the power of a desired device. For example, if power OFF/ON execution is enabled at the time of recovery processing in a nonreactive state that has been described with reference to FIG. 5B, the power of the failed HDD 114 is turned OFF and then ON to try a recovery work. Then, in step S624, the BCPU 310 determines whether recovery processing has succeeded. If it is determined in step S624 that the recovery processing has succeeded (YES in step S624), the BCPU 310 returns to a state of receiving a next command. If it is determined in step S622 that the power OFF/ON is not executed (NO in step S622), or if it is determined in step S624 that the recovery processing has failed (NO in step S624), the processing proceeds to step S625. The processes in steps S622 and S623 may be omitted.

In step S625, the BCPU 310 continues an operation as a degraded state for causing a device on the recovery side to be an unused state as a system. Furthermore, the BCPU 310 identifies an NG device, and displays a warning prompting a replacement work, on the panel device 116, for example, via the panel IF unit 115.

With such a configuration, even if there is a storage that does not respond to a writing command within a predetermined time, it is possible to prevent a host controller from erroneously recognizing that all storages are in an error state.

Figure 8:
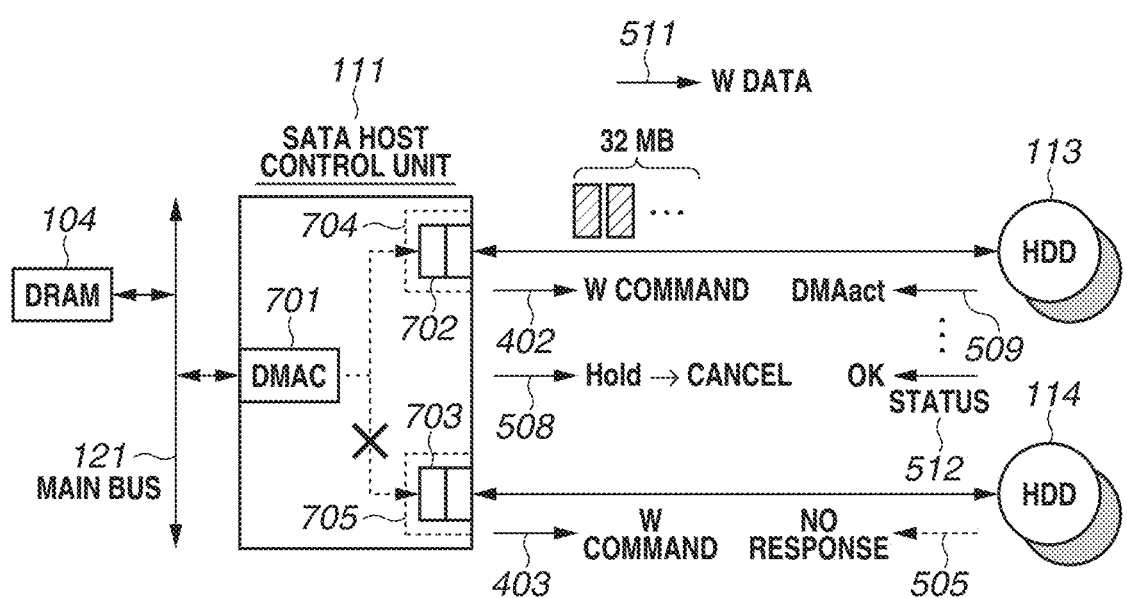
FIG. 8 is a configuration diagram illustrating stop processing performed when a nonreactive storage emerges, according to a second exemplary embodiment.

FIG. 8 is a configuration diagram illustrating stop processing performed when a nonreactive storage emerges, according to a second exemplary embodiment.

FIG. 8 illustrates an example case of executing mirroring processing by connecting two HDDs 113 and 114 to the SATA host control unit 111 without mounting the SATA bridge control unit 112. In FIG. 8, the SATA host control unit 111 includes SATA-IPs 704 and 705. The SATA-IPs 704 and 705 have a function equivalent to that of the SATA-IPs 204 and 205 in FIG. 3. Thus, buffers 702 and 703 are data transmission/reception buffers for Host1 and Host2, and have a function equivalent to the buffers 412 and 413 illustrated in FIGS. 4A, 4B, and 4C.

Because the writing processing in FIG. 8 is the same as the processing in FIG. 5, the description will be given while assigning the same reference numerals as those in FIGS. 4A, 4B, 4C, and 5 to the configurations having equivalent functions.

The buffers 702 and 703 are data transmission/reception buffers for Host1 and Host2, and have a function equivalent to the buffers 412 and 413 illustrated in FIGS. 4A, 4B, 4C. The buffer 702 is included in the SATA-IP (Host1) 204 and the buffer 703 is included in the SATA-IP (Host2) 205.

The SATA host control unit 111 receives a W command from the CPU 101. If the SATA host control unit 111 receives a W command, the SATA host control unit 11 acquires, by the DMAC 701, data to be written, from the DRAM 104 connected onto the main bus. The DMAC 701 stores the acquired data into the buffers 702 and 703 in a divided manner similarly to the configuration described in the first exemplary embodiment.

In addition, because the DMAC 701 has only one channel, when storing the W data 503 corresponding to the W command 501, into each buffer, it is necessary to transmit divided data to a corresponding buffer. Thus, if the HDD 114 enters a state of being nonreactive to a W command, the buffer 703 becomes unable to transmit divided data of the second time and subsequent times.

Thus, also in the present exemplary embodiment, when one HDD enters a nonreactive state, data transmission to the one HDD is stopped, and data transmission to the other HDD is continued. Then, if writing processing of the other HDD has succeeded, a notification indicating that the writing processing has succeeded is issued to an upper level circuit (the CPU 101). The details thereof will be described with reference to FIG. 8.

First of all, the SATA host control unit 111 receives a W command from the upper level CPU 101. The SATA host control unit 111 transmits the W commands 402 and 403 respectively to the HDDs 113 and 114, sets the first timer with the transmission of the W commands 402 and 403 as a starting point, and starts the time count of the first timer.

The SATA host control unit 111 receives a response (e.g., DMAact packet 502) to the W command from one of the HDDs 113 and 114. Upon receiving the response, the HCPU 301 stores, into the SRAM 304 or the register H 306, a notification indicating that data transfer to the HDD 113 has started. Then, the SATA host control unit 111 sets the second timer with the response as a starting point (data transfer start interrupt), and starts the time count of the second timer. The second timer (second threshold value of elapsed time) is a value shorter than the first timer (first threshold value of elapsed time).

If the SATA host control unit 111 does not receive a response (data transfer start interrupt) from the HDD 114 even though the second timer times out, the SATA host control unit 111 performs stop processing on the HDD 114. Then, if the SATA host control unit 111 receives, from the HDD 113, a notification indicating that the writing processing has succeeded before the first timer times out, the SATA host control unit 111 transmits the notification indicating that the writing processing has succeeded, to the CPU 101. The description of stop processing and subsequent recovery processing will be omitted.

If the SATA host control unit 111 receives a response (data transfer start interrupt) from the HDD 114 before the second timer times out, writing processing to the HDD 114 is continued. Then, if the SATA host control unit 111 receives a notification indicating that the writing processing has succeeded from at least one of the HDDs 113 and 114 before the first timer times out, the SATA host control unit 111 transmits the notification indicating that the writing processing has succeeded, to the CPU 101.

A state where the SATA host control unit 111 can issue a command to each device means a state where each HDD is in a ready state (not busy). Once the SATA host control unit 111 issues a command, there is no other choice but to wait for a response from an HDD.

Similar to the first exemplary embodiment, the description has been given of an example in which a data transfer start is detected based on an interrupt signal from a SATA-IP, but the detection method is not limited to this method. As another example, a data transfer start may be detected based on a change in a counter value of the number of data transfer times.

With such a configuration, even if there is a storage that does not respond to a writing command within a predetermined time, it is possible to prevent a host controller (CPU 101 in this example) from erroneously recognizing that all storages are in an error state.

A third exemplary embodiment will be described in detail with reference to FIGS. 9 and 10. The description of the configurations similar to those in the first exemplary embodiment will be omitted by assigning the same reference numerals.

Figure 9:
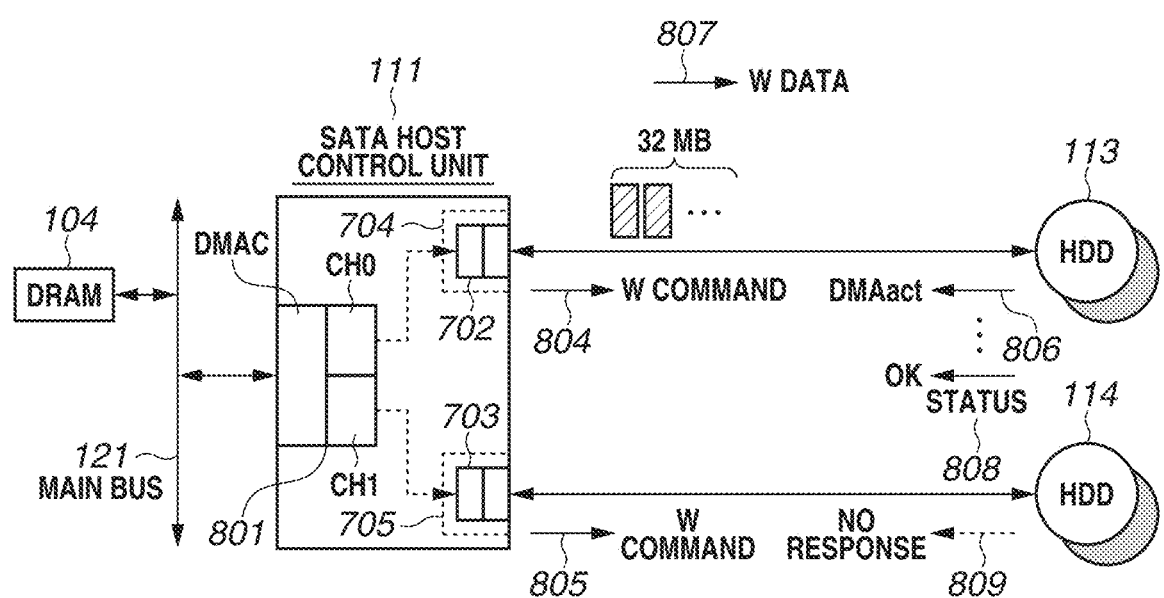
FIG. 9 is a configuration diagram illustrating a control to be performed when a nonreactive storage emerges, according to a third exemplary embodiment.
Figure 10:
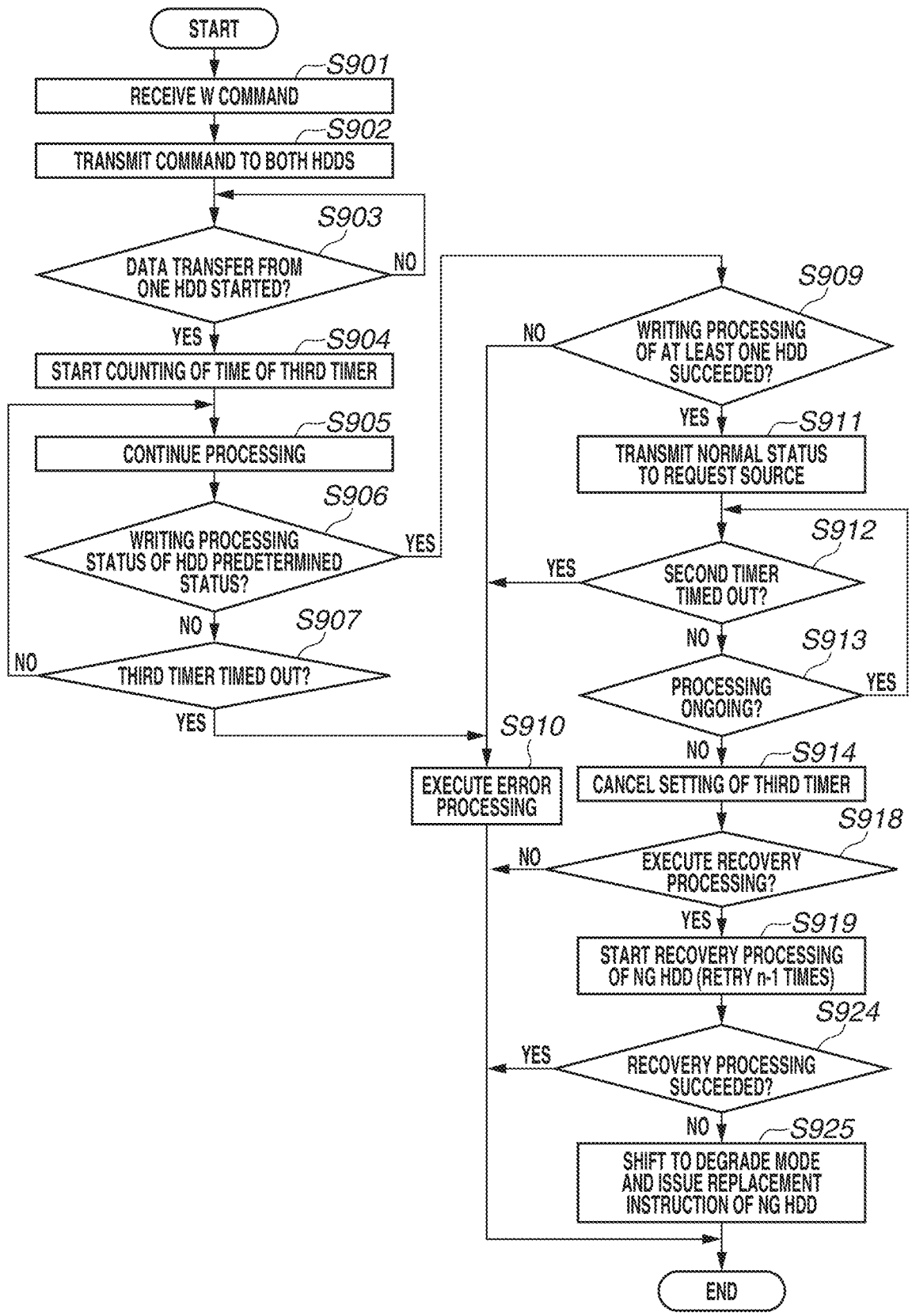
FIG. 10 is a flowchart illustrating a writing processing procedure according to the third exemplary embodiment.

FIG. 9 illustrates a control configuration according to the present exemplary embodiment for dealing with a problem generated by a nonreactive storage.

In FIG. 9, a DMAC 801 is provided with two channels each can be independently processed, and a CH0 of the DMAC 801 is connected with the buffer 702 and a CH1 is connected with the buffer 703.

Also in this configuration, as illustrated in FIG. 9, it is possible to prevent a host controller from erroneously recognizing that all HDDs are in an error state, even if the HDD 114 returns no response 809 after the transmission of a W command 805.

If the SATA host control unit 111 receives a W command from the CPU 101, the SATA host control unit 111 outputs W command 804 and 805 respectively to the HDDs 113 and 114. Then, if the SATA-IP 704 receives a response (DMAact 806) from the HDD 113, the HCPU 301 sets a third timer with the response as a starting point, and starts the count of a time limit.

In the configuration illustrated in FIG. 9, writing processing of the HDD 113 and writing processing of the HDD 114 can be independently executed. Thus, the SATA host control unit 111 can continuously execute the transfer in a data packet unit with every DMAact 806, from the HDD 113, as a starting point, irrespective of a status of writing processing of the HDD 114.

Thus, even if the HDD 114 enters a nonreactive state, writing processing of the HDD 113 can be successfully executed. More specifically, the SATA host control unit 111 can receive a status 808 indicating that writing processing of the HDD 113 has succeeded, before the third timer times out. On the other hand, writing processing of the HDD 114 in the nonreactive state cannot be completed even if the second timer times out. The stop processing of the HDD 114 is executed, and the HCPU 301 determines that the HDD 114 is in an error status.

In such a situation, the HCPU 301 determines that writing processing has succeeded, and issues a writing completion interrupt signal to the CPU 101. On the other hand, subsequent recovery processing in the background that is to be performed on the HDD 114 having been subjected to the stop processing has already been described with reference to FIG. 4C. Thus, the description thereof will be omitted.

An example of a writing processing flow for implementing the configuration according to the present exemplary embodiment described with reference to FIG. 9 will be described with reference to FIG. 10. FIG. 10 is a flowchart illustrating a processing flow of writing processing in the mirroring configuration including a DMAC having two independent channels, described with reference to FIG. 9.

Figure 7:
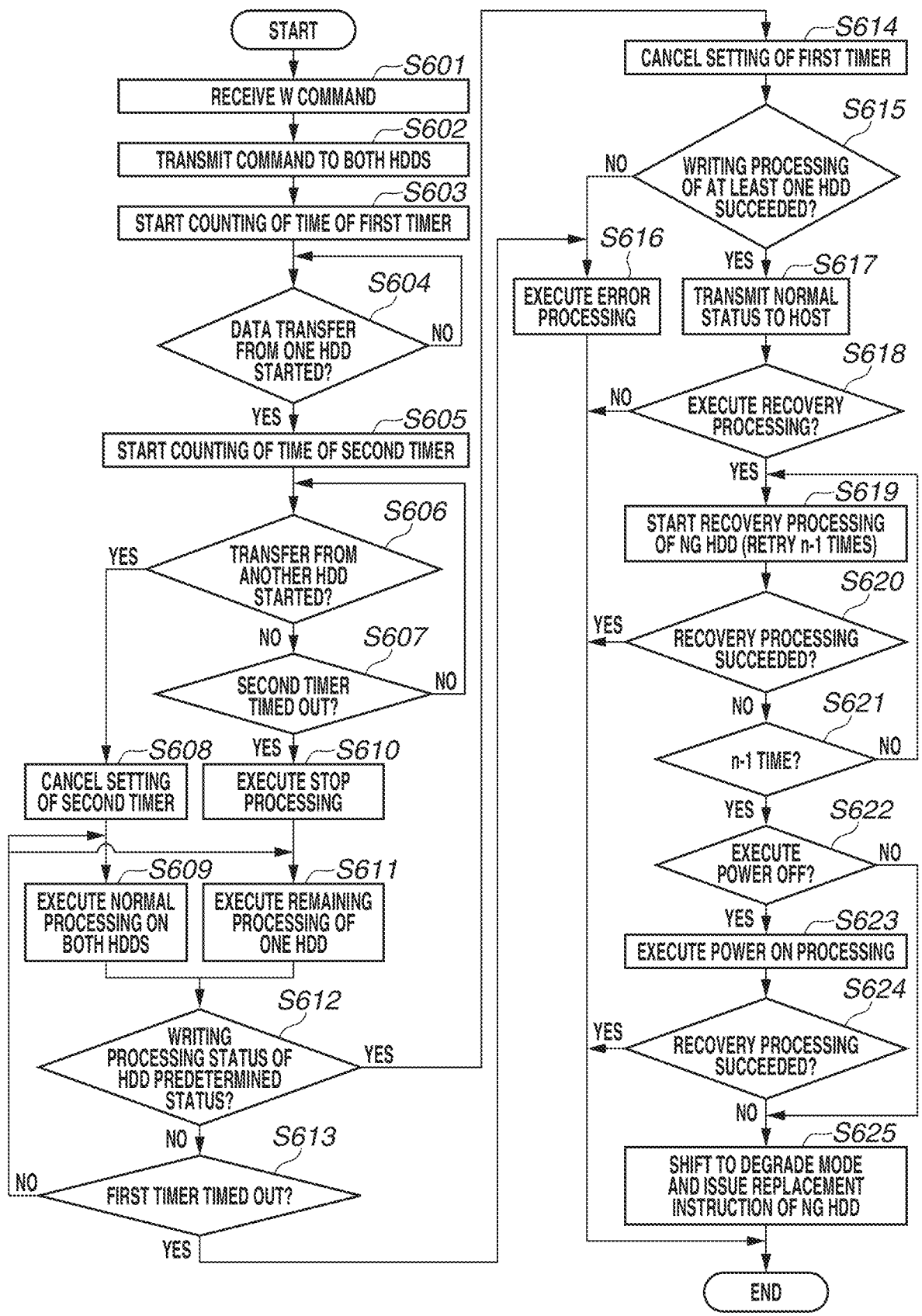
FIG. 7 is a flowchart illustrating a writing processing procedure according to the first exemplary embodiment.

The description of steps similar to those in FIG. 7 will be omitted by assigning similar step numbers. The flowchart in FIG. 10 is executed by the HCPU 301.

In step S901, the HCPU 301 receives a W command from an upper level application (CPU 101). In step S902, the HCPU 301 interprets the content of the received command, and transmits W commands indicating the same content, to the connected HDDs 113 and 114.

In step S903, the HCPU 301 waits for a response (data transfer start interrupt) from at least one of the HDDs 113 and 114 (NO in step S903). If the HCPU 301 receives a response from at least one HDD (YES in step S903), the HCPU 301 starts data transfer to the HDD that has returned the response. If data transfer to the at least one HDD has started, the processing proceeds to step S904.

In step S904, the HCPU 301 sets the third timer (third threshold value of elapsed time) in a timer circuit, and starts counting a time limit of the entire command processing.

In step S905, data transfer and writing processing of the HDD are continued even after the setting of the third timer.

In step S906, the HCPU 301 determines whether a writing processing status of both of the HDDs 113 and 114 is a predetermined status.

The predetermined status is either status of a status indicating that writing processing of at least one HDD has been normally completed, and a status indicating that writing processing of all HDDs has become error. Being in the status indicating that writing processing of at least one HDD has been normally completed corresponds, for example, to a case where the HDD 113 is in a normal status and the HDD 114 is in an error state or writing processing of the HDD 114 is ongoing.

If it is determined in step S906 that the writing processing status is not the predetermined status (NO in step S906), the processing proceeds to step S907.

In step S907, the HCPU 301 determines whether the third timer has timed out. If the third timer has not timed out (NO in step S907), the processing returns to step S905, and the processing is continued. If it is determined in step S907 that the third timer has timed out (YES in step S907), the processing proceeds to step S910. In step S910, the HCPU 301 transmits an error status to CPU 101.

Referring back to step S906, if it is determined that the writing processing status is the predetermined status (YES in step S906), the processing proceeds to step S909.

In step S909, the HCPU 301 checks the result (status) of writing processing of the HDDs 113 and 114. If statuses of both the HDDs 113 and 114 indicate a failure of the writing processing (NO in step S909), the processing proceeds to step S910.

If it is determined in step S909 that statuses of all HDDs indicate a success of writing processing, or if a status of at least one HDD indicates a success of writing processing (YES in step S909), the processing proceeds to step S911.

In step S911, the HCPU 301 transmits a status indicating that W command processing has been normally completed, to the CPU 101 that is a request source, and processing between the CPU 101 and the SATA host control unit 111 ends.

In step S912, the HCPU 301 determines whether the third timer has timed out. If it is determined in step S912 that the third timer has timed out (YES in step S912), the processing proceeds to step S910. In this case, in step S910, because the HCPU 301 has completed communication with the CPU 101, the HCPU 301 executes other types of predetermined error processing, which will not be described in detail. If it is determined that the third timer has not timed out (NO in step S912), the processing proceeds to step S913. In step S913, the HCPU 301 determines whether processing of the other HDD is ongoing. If it is determined in step S913 that the processing of the other HDD is ongoing (YES in step S913), the processing returns to step S912, and the processes in steps S912 and S913 are repeated. If it is determined in step S913 that the processing of the other HDD is not ongoing (NO in step S913), the processing proceeds to step S914. In step S914, the HCPU 301 cancels the setting of the third timer, and the processing proceeds to step S618.

The description of the processes in steps S618 to S625 will be omitted. In this flowchart, the processes in steps S621 to S623 in FIG. 7 are omitted.

With such a configuration, even if there is a storage that does not respond to a writing command within a predetermined time, it is also possible to prevent a host controller from erroneously recognizing that all storages are in an error state.

Other Exemplary Embodiments

Various examples and exemplary embodiments of the present disclosure have been described above, but the gist and the scope of the present disclosure are not limited to the specific descriptions in this specification.

An exemplary embodiment of the present disclosure can also be implemented by processing of supplying a program for implementing one or more functions of the above-described exemplary embodiments, to a system or an apparatus via a network or a storage medium, and one or more processors in a computer of the system or the apparatus reading out the program and executing the program. In addition, an exemplary embodiment of the present disclosure can also be implemented by a circuit (e.g., ASIC) that implements one or more functions.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-208993, filed Nov. 19, 2019, which is hereby incorporated by reference herein in its entirety.

What is claimed is:

1. An information processing apparatus including a nonvolatile first storage device and a nonvolatile second storage device, the information processing apparatus comprising;
a first controller configured to transmit a writing instruction of data;
a first communication interface (IF) configured to receive the writing instruction of data transmitted from the first controller;
a second communication IF configured to transmit the writing instruction to the first storage device;
a third communication IF configured to transmit the writing instruction to the second storage device; and
a second controller configured to control transmission of data to the first storage device via the second communication IF, and transmission of data to the second storage device via the third communication IF, and to respond to the first controller via the first communication IF by receiving a response to the writing instruction of data from the first storage device and the second storage device, wherein, based on a status in which a response to the writing instruction is received from the first storage device, and a response to the writing instruction is not received from the second storage device, the second controller continues transmission of the data to the first storage device, and stops transmission of the data to the second storage device, and wherein, in a case where transmission of the data to the second storage device is stopped, the first communication IF transmits a second completion notification of processing corresponding to the writing instruction to the first controller by receiving a first completion notification of the data issued by the first storage device.

2. The information processing apparatus according to claim 1, wherein, by receiving a first failure notification of storing the data into the first storage device by the second communication IF, the first communication IF transmits a second failure notification of processing corresponding to the writing instruction to the first controller.

3. The information processing apparatus according to claim 1,
wherein the second controller performs counting of a first timer upon receiving a response to the writing instruction from the first storage device, and
wherein, in a case where the first timer exceeds a first threshold value without receiving a response to the writing instruction from the second storage device, the second controller continues transmission of the data to the first storage device, and stops transmission of the data to the second storage device.

4. The information processing apparatus according to claim 3, wherein, in a case where a response to the writing instruction is received from the second storage device before the first timer exceeds the first threshold value, the second controller cancels the first timer.

5. The information processing apparatus according to claim 3, wherein, in a case where a response to the writing instruction is received from the second storage device before the first timer exceeds the first threshold value, the second controller continues transmission of the data to the first storage device and the second storage device.

6. The information processing apparatus according to claim 3,
wherein the second controller starts counting of a second timer upon the second communication IF and the third communication IF transmitting a writing instruction of the data, and
wherein, in a case where the second communication IF receives the first completion notification issued by the first storage device before the second timer exceeds a second threshold value, the first communication IF transmits the second completion notification to the first controller.

7. The information processing apparatus according to claim 6, wherein, in a case where the second communication IF does not receive the first completion notification issued by the first storage device when the second timer exceeds the second threshold value, the first communication IF transmits a failure notification of processing corresponding to the writing instruction to the second controller.

8. The information processing apparatus according to claim 3,
wherein the second controller starts counting of a second timer upon the second communication IF and the third communication IF transmitting a writing instruction of the data, and
wherein, by satisfying at least one of a first condition requiring that the second communication IF receives the first completion notification issued by the first storage device, or a second condition requiring that the third communication IF receives a third completion notification of storing the data issued by the second storage device, before the second timer exceeds a second threshold value, the first communication IF transmits the second completion notification of processing corresponding to the writing instruction to the first controller.

9. The information processing apparatus according to claim 8, wherein, in a case where the second communication IF does not receive the first completion notification issued by the first storage device, and the third communication IF does not receive the third completion notification of storing the data issued by the second storage device, when the second timer exceeds the second threshold value, the first communication IF transmits a failure notification of processing corresponding to the writing instruction to the first controller.

10. The information processing apparatus according to claim 1,
wherein the second controller determines whether recovery processing of causing the second storage device to store the data stored in the first storage device is necessary, and
wherein, in a case where the recovery processing is necessary, the second controller reads out the data stored in the first storage device, and causes the second storage device to store the read-out data.

11. The information processing apparatus according to claim 1, further comprising a first serial advanced technology attachment (SATA) circuit including the first communication IF, the second communication IF, the third communication IF, and the second controller and a second SATA circuit including the first controller.

12. The information processing apparatus according to claim 1, further comprising:
a central processing unit (CPU) configured to control the image processing unit; and
wherein the CPU transmits a writing instruction of the data to the first communication IF via the first controller, and
wherein the first communication IF transmits a notification corresponding to the writing instruction to the CPU via the first controller.

13. The information processing apparatus according to claim 1, further comprising:
a printer configured to print image data onto a sheet;
an image processing circuit configured to perform image processing of the image data;
a first SATA circuit including the first controller; and
a second SATA circuit including the first communication IF, the second communication IF, the third communication IF, and the second controller.

14. A control method of an information processing apparatus including a nonvolatile first storage device and a nonvolatile second storage device, a first controller configured to transmit a writing instruction of data, a first communication IF configured to receive a-the writing instruction of data transmitted from the first controller, a second communication IF configured to transmit the writing instruction to the first storage device, a third communication IF configured to transmit the writing instruction to the second storage device, and a second controller configured to control transmission of data to the first storage device via the second communication IF, and transmission of data to the second storage device via the third communication IF, and to respond to the first controller via the first communication IF by receiving a response to the writing instruction of data from the first storage device and the second storage device, the control method comprising:
the controller continuing transmission of the data to the first storage device, and stopping transmission of the data to the second storage device, based on a status in which a response to the writing instruction is received from the first storage device, and a response to the writing instruction is not received from the second storage device, and
the first communication IF transmitting a second completion notification of processing corresponding to the writing instruction to the first controller by receiving a first completion notification of the data issued by the first storage device, in a case where transmission of the data to the second storage device is stopped.

* * * * *